(12) United States Patent
Eisenberg et al.

(10) Patent No.: US 10,737,889 B2
(45) Date of Patent: Aug. 11, 2020

(54) POUCH CONVEYOR

(71) Applicant: Intelligrated Headquarters, LLC, Mason, OH (US)

(72) Inventors: Howard Bradley Eisenberg, Mason, OH (US); Darius Scott, Baltimore, MD (US); Joseph Joice, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/173,457

(22) Filed: Oct. 29, 2018

(65) Prior Publication Data

US 2020/0130952 A1    Apr. 30, 2020

(51) Int. Cl.
| | |
|---|---|
| B65G 47/38 | (2006.01) |
| B65G 19/02 | (2006.01) |
| B65B 43/30 | (2006.01) |
| B65G 65/32 | (2006.01) |
| B65G 65/40 | (2006.01) |

(52) U.S. Cl.
CPC .............. *B65G 47/38* (2013.01); *B65B 43/30* (2013.01); *B65G 65/32* (2013.01); *B65G 65/40* (2013.01); *B65G 2201/0238* (2013.01)

(58) Field of Classification Search
None
See application file for complete search history.

(56) References Cited

U.S. PATENT DOCUMENTS

| 7,337,892 | B2 * | 3/2008 | Groot | B65G 17/066 |
| | | | | 198/369.3 |
| 9,187,252 | B2 * | 11/2015 | Wend | B65G 17/12 |
| 10,322,887 | B2 * | 6/2019 | Fenile | B65G 9/004 |

OTHER PUBLICATIONS

Warehouse Logistics, SSI Carrier: The highly-dynamic pouch sorter system for eCommerce and omni-channel distribution, Mar. 7, 2018, YouTube, 2, https://www.youtube.com/watch?v=g2J3KJnK_ok&t=51s, Oct. 29, 2018.
Mahler, Stefan R., Skyfall Pouch Sorter, Feb. 27, 2018, YouTube, 2 pages, https://www.youtube.com/watch?v=h7N_ERnwV78, Oct. 29, 2018.

* cited by examiner

*Primary Examiner* — Kavel Singh
(74) *Attorney, Agent, or Firm* — Alston & Bird LLP

(57) ABSTRACT

The present disclosure relates to a pouch conveying system for routing one or more pouches. Each pouch may include at least one self-closing frame attached to an end of a pouch body. The self-closing frame has a first frame section having at least two portions coupled to each other through a first joint, and a second frame section having at least two portions coupled to each other through a second joint. The second frame section coupled to the first frame section at a first end by a first coupler and at a second end by a second coupler, such that at least one of the first coupler and the second coupler move inward, flexing the first frame section and the second frame section about the first joint and the second joint.

20 Claims, 6 Drawing Sheets

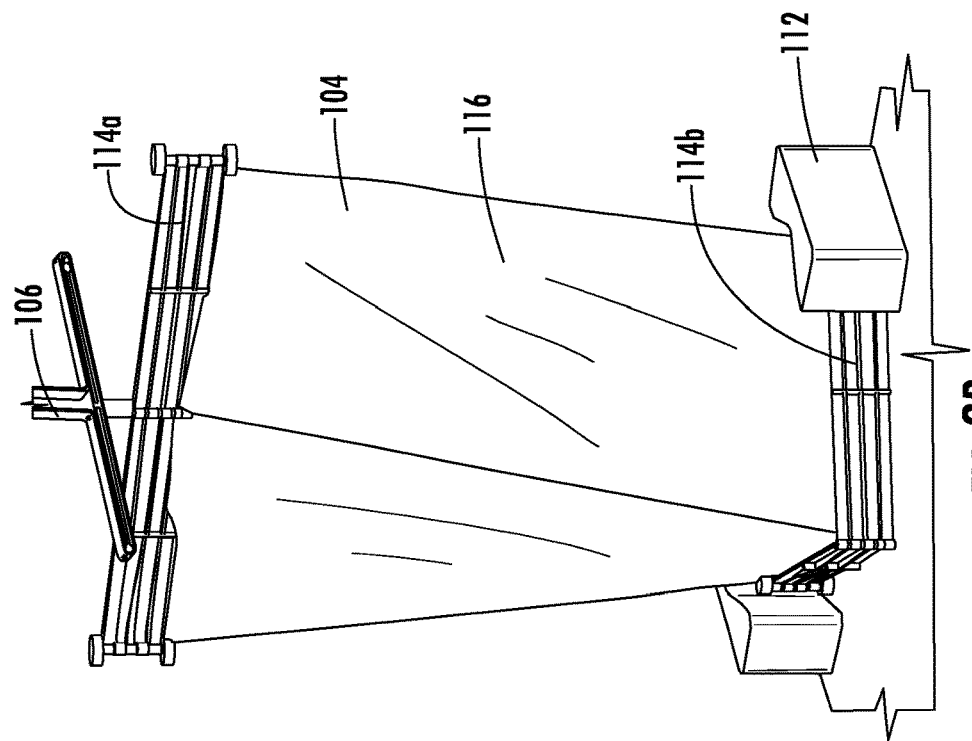
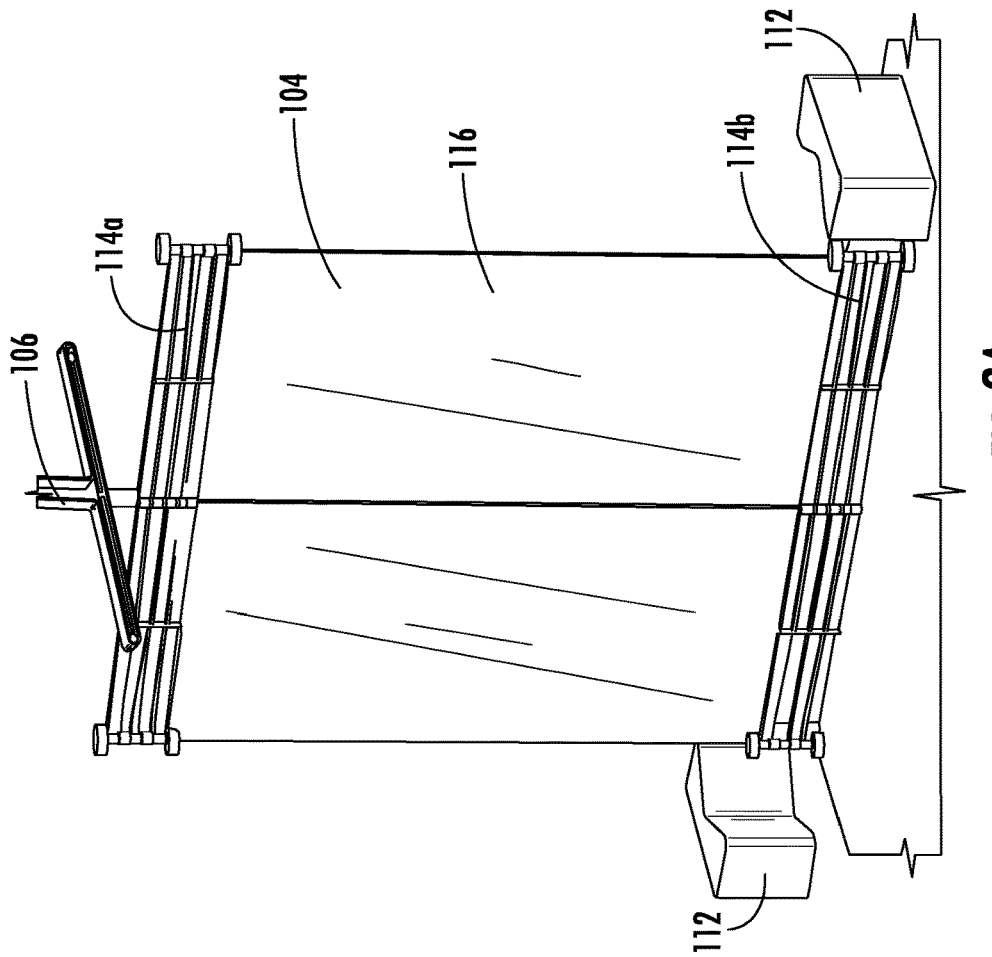

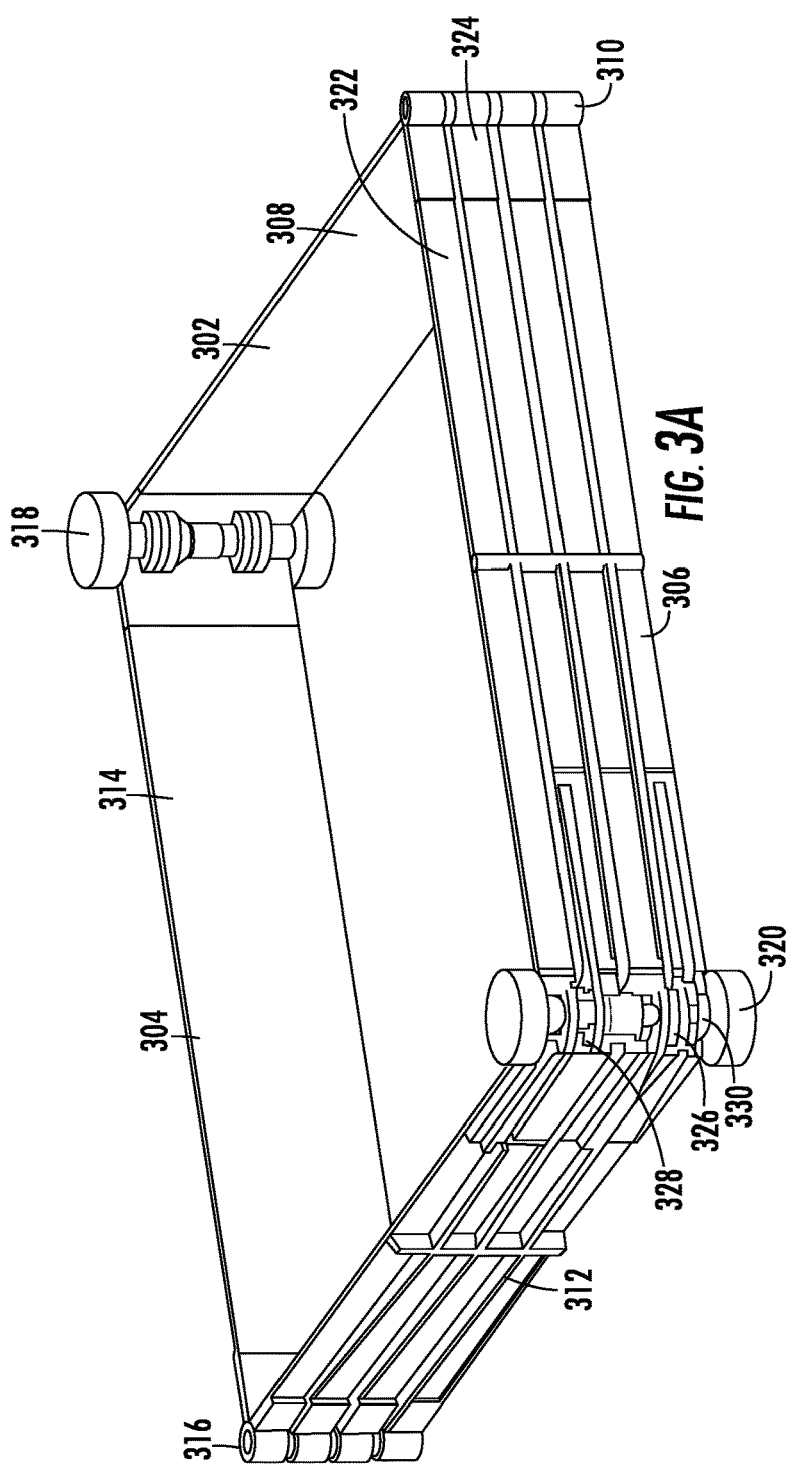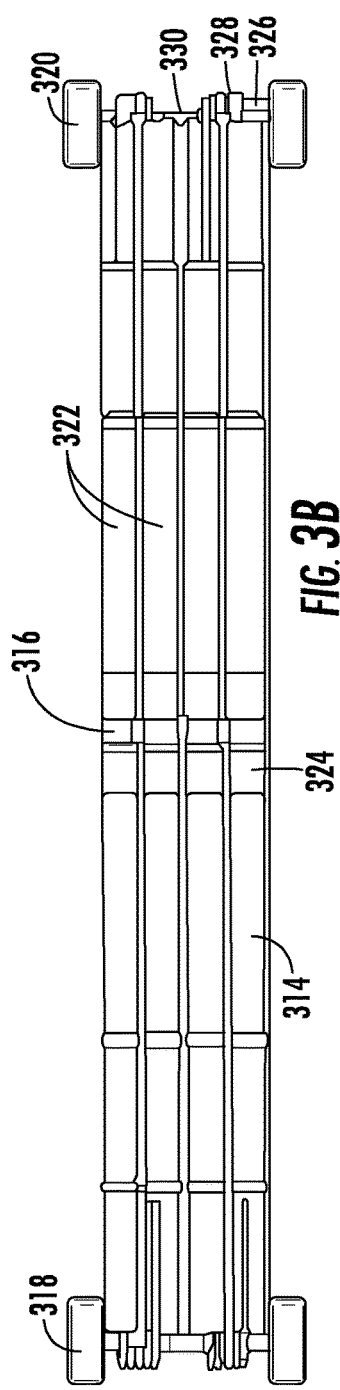

POUCH CONVEYOR

TECHNOLOGICAL FIELD

Example embodiments of the present invention relate generally to a material handling system, and more particularly, to a system for conveying pouches and/or bags.

BACKGROUND

In a high-volume distribution and fulfillment center, bag and/or pouch handling methods and systems play an important part in overall efficiency of the distribution center. Pouches are often used to convey goods, such as small articles, from a loading station to an unloading station.

Applicant has identified several technical challenges associated with pouch handling and other associated systems and methods. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed pouch conveying system. This summary is not an extensive overview and is intended to neither identify key or critical elements nor delineate the scope of such elements. Its purpose is to present some concepts of the described features in a simplified form as a prelude to the more detailed description that is presented later.

The illustrative embodiments of the present disclosure relate to systems and methods for handling pouches in a material handling environment. According to at least one aspect of the present disclosure, a pouch conveying system is provided. The pouch conveying system includes an overhead conveyor having one or more pouch hangers, the overhead conveyor routes the one or more pouch hangers. Further, one or more pouches may be suspended from the overhead conveyor through the one or more pouch hangers. A pouch may include at least one self-closing frame attached to an end of a pouch body, the self-closing frame having a first frame section having at least two portions coupled to each other through a first joint, and a second frame section having at least two portions coupled to each other through a second joint. The second frame section coupled to the first frame section at a first end by a first coupler and at a second end by a second coupler, such that at least one of the first coupler and the second coupler move inward flexing the first frame section and the second frame section about the first joint and the second joint.

According to one or more embodiments of the present disclosure, the pouch conveying system further includes one or more pouch opening devices to push the at least one of the first coupler and the second coupler inward flexing the first frame section and the second frame section about the first joint and the second joint to open the at least one pouch.

According to one or more embodiments of the present disclosure, at least one of the first coupler and the second coupler move outward to straighten the at least one of the first frame section and the second frame section on removal of a force applied by the pouch opening devices to close the pouch.

According to one or more embodiments of the present disclosure, each of the first frame section and the second frame section may include a plurality of clamp plates.

According to one or more embodiments of the present disclosure, at least one of the first joint and the second joint may include a leaf spring device.

According to one or more embodiments of the present disclosure, at least one of the first coupler and the second coupler may include a torsion spring device.

According to one or more embodiments of the present disclosure, a pouch may include an upper self-closing frame attached to an upper end of the pouch body and a lower self-closing frame attached to a lower end of the pouch body.

According to one or more embodiments of the present disclosure, in response to detecting a loading condition, at least one of a first coupler and a second coupler of the upper self-closing frame may move inward to flex a first frame section and a second frame section of the upper self-closing frame about a first joint and a second joint, creating a top opening for loading one or more articles into the at least one pouch through the top opening.

According to one or more embodiments of the present disclosure, in response to detecting an unloading condition, at least one of a first coupler and a second coupler of the lower self-closing frame may move inward to flex a first frame section and a second frame section of the lower self-closing frame about a first joint and a second joint, creating a bottom opening for unloading one or more articles from the at least one pouch through the bottom opening.

According to one or more embodiments of the present disclosure, the pouch hangers may include at least one channel and at least one stabilizing pin movable in the at least one channel. The stabilizing pin may be coupled to at least one of the first joint and the second joint of the self-closing frame, such that the stabilizing pin moves towards an end of the channel for flexing the at least one of the first frame section and the second frame section.

According to one or more embodiments of the present disclosure, the pouch hangers may include at least two stabilizing pins movable in two channels, each coupled to the first joint and the second joint of the self-closing frame respectively, such that the at least two stabilizing pins may be positioned at proximate ends of the two channels when the self-closing frame is closed. Further, at least two stabilizing pins may move towards distal ends of the two channels when the self-closing frame is flexed.

According to one or more embodiments of the present disclosure, the pouch hangers may be disposed at an angle relative to the overhead conveyor.

According to another aspect of the present disclosure, a pouch for carrying one or more articles for conveyance on a pouch conveying system is provided. The pouch may include a pouch body for enclosing and holding the articles, and at least one self-closing frame attached to an end of the pouch body. The self-closing frame may include a first frame section having at least two portions coupled to each other through a first joint, and a second frame section having at least two portions coupled to each other through a second joint. The second frame section may be coupled to the first frame section at a first end by a first coupler and at a second end by a second coupler such that at least one of the first coupler and the second coupler may move inward flexing the first frame section and the second frame section about the first joint and the second joint.

According to one or more embodiments of the present disclosure, each of the first frame section and the second frame section may include a plurality of clamp plates.

According to one or more embodiments of the present disclosure, the at least one of the first joint and the second joint may include a leaf spring device.

According to one or more embodiments of the present disclosure, the at least one of the first coupler and the second coupler may include a torsion spring device.

According to one or more embodiments of the present disclosure, the at least one of the first coupler and the second coupler may be pushed by a pouch opening device to move them inward flexing the first frame section and the second frame section about the first joint and the second joint to open the pouch.

According to one or more embodiments of the present disclosure, the at least one of the first coupler and the second coupler may move outward to straighten the at least one of the first frame section and the second frame section on removal of a force applied by the pouch opening device to close the pouch.

According to another aspect of the present disclosure, a method of operating a pouch conveying system is provided. The method may include routing at least one pouch suspended from an overhead conveyor of the pouch conveying system in a conveyance direction. The at least one pouch may have an upper self-closing frame attached to an upper end of a pouch body and a lower self-closing frame attached to a lower end of the pouch body. Further, each of the upper self-closing frame and the lower self-closing frame may include a first frame section having at least two portions coupled to each other through a first joint, and a second frame section having at least two portions coupled to each other through a second joint, such that the second frame section may be coupled to the first frame section at a first end by a first coupler and at a second end by a second coupler. The method may further include determining a loading condition for the at least one pouch. The loading condition may indicate one or more articles to be loaded into the at least one pouch. In response to determining the loading condition, the method may include moving at least one of the first coupler and the second coupler of the upper self-closing frame inward to flex the first frame section and the second frame section of the upper self-closing frame about the first joint and the second joint, creating a top opening to the pouch, and loading the one or more articles into the pouch through the top opening. The method may further include determining an unloading condition for the at least one pouch. The unloading condition may indicate the one or more articles to be unloaded from the at least one pouch. In response to determining the unloading condition, the method may include moving at least one of the first coupler and the second coupler of the lower self-closing frame inward to flex the first frame section and the second frame section of the lower self-closing frame about the first joint and the second joint, creating a bottom opening to the pouch, and unloading the one or more articles from the pouch through the bottom opening.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 2a-2b illustrate perspective views of a pouch for carrying articles, in accordance with one or more embodiments of the present disclosure;

FIGS. 3a-3b illustrate perspective views of a self-closing frame for a pouch in accordance with one or more embodiments of the present disclosure;

DETAILED DESCRIPTION

Figure 1:
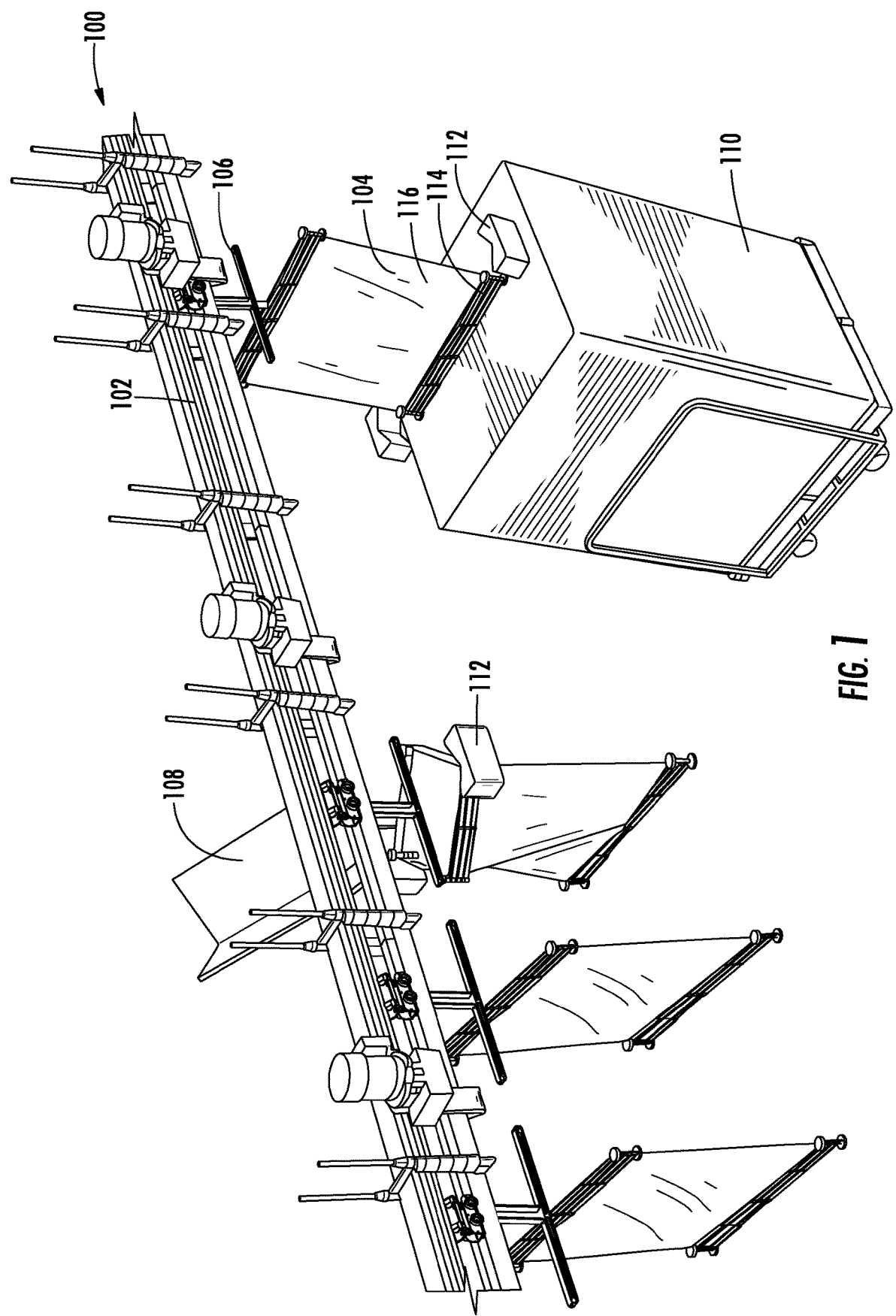
FIG. 1 illustrates a perspective view of a pouch conveying system in accordance with an embodiment of the present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements.

The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Overview

In a distribution and/or order fulfillment center, pouches and/or bags are generally used to temporarily store goods for handling and/or for conveying to a handling station. For example, pouches may be loaded with goods (such as small articles) at a destination chute of a sortation system, and may convey the goods to an unloading station (such as a bin). Thus, it is essential for the pouch to be open for loading and/or unloading while also ensuring that the loaded goods are secured while being conveyed in the distribution center.

Conventional systems may require a pouch to be always open for loading, and may require a human operator to unload pouch contents at the unloading station.

As described further below, automatically controlling the opening and closing of the pouches is essential to increasing the efficiency of the distribution center while securing goods carried in the pouches. Automating pouch handling process can reduce time, manpower, and cost. An automated system can selectively open the pouch for loading at the loading stations and/or unloading at the unloading stations, while keeping the pouch closed at other times for preventing goods from falling out of the pouch. Thus, various embodiments of the present invention improves overall efficiency and accuracy of distribution and/or order fulfillment centers, especially those centers having high volumes of goods.

In particular, the pouch conveying system described herein in accordance with one or more embodiments of the present disclosure includes one or more pouches with self-closing frames that may be selectively flexed by pouch opening devices for creating an opening at the top of the pouch for loading and/or at the bottom of the pouch for unloading, while maintaining the pouch closure at all other times through the self-closing frames.

Example System Architecture for Implementing Embodiments of the Present Invention Turning now to the Drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views.

FIG. 1 illustrates a perspective view of a pouch conveying system 100, in accordance with one or more embodiments of the present disclosure. As shown in FIG. 1, the pouch conveying system 100 may include an overhead conveyor 102 for conveying one or more pouches 104. In accordance with an embodiment, the overhead conveyor 102 may include one or more pouch hangers 106 coupled to the overhead conveyor 102, such that the overhead conveyor 102 may route the pouch hangers 106 in a direction of conveyance. The pouch hangers 106 may be suspended from the overhead conveyor 102, as shown in FIG. 1. Further, each pouch hanger 106 may be coupled to and/or hold a pouch 104, such that the pouches 104 may be suspended from the overhead conveyor 102 through the pouch hangers 106.

In an embodiment, the pouch hangers 106 and/or the pouches 104 may be suspended at an angle relative to the overhead conveyor 102. In some embodiments, the pouch hangers 106 may be rotated to an 30 degrees angle relative to the overhead conveyor 102. The pouch hangers 106 may force the pouches 104 be coupled to the pouch hangers 106 to travel in the same orientation as the pouch hangers 106. This angular orientation of the pouch hangers 106 and/or the pouches 104 results in better pouch nestling along a path of travel.

Further, in accordance with an embodiment of the present disclosure, the pouch conveying system 100 may include a loading station 108 and an unloading station 110, as shown in FIG. 1. The loading station 108 may refer to a system and/or an area in a distribution center for loading the one or more pouches 104 with articles. The unloading station 110 may refer to a system and/or an area in a distribution center for unloading articles from the one or more pouches 104. In an embodiment, the loading station 108 may include a destination chute of a sorter conveyor, as shown in FIG. 1. In an embodiment, the unloading station 110 may include a buck box ("gaylord") and/or a tote for receiving the articles unloaded from the one or more pouches 104, as shown in FIG. 1.

In accordance with an embodiment of the present disclosure, the loading station 108 and/or the unloading station 110 may include one or more pouch opening devices 112. Pouch opening device 112 may refer to a means for opening the pouch 104 for loading and/or unloading. In an embodiment, the pouch opening device 112 may include one or more v-blocks, as shown in FIG. 1. The v-blocks, in accordance with an embodiment of the present disclosure, may have a unitary construction having a v-shaped groove and/or depression. In another embodiment, the v-blocks may be formed by joining one or more parts together to form the v-shaped depression. The v-shaped depression may enable the v-blocks to engage with the pouches 104, as will be described later.

Further, the v-blocks may index from a first position to a second position for opening the pouch 104. The term "index" as used herein may refer to a quick and precise motion of the pouch opening device 112 (such as the v-blocks) towards each other while engaging with the pouch 104, thereby pushing the pouch 104 to an open position. Specifically, each pouch 104 may include one or more self-closing frames 114 attached to an end of a pouch body 116. The pouch opening device 112 may engage with the self-closing frame 114 to open the pouch 104 for loading and/or unloading. Further, the pouch opening device 112 (for example, the v-blocks) may be coupled to a robotic arm, a slider, and/or any other means for enabling a translational and/or indexing motion of the pouch opening device 112 for opening the pouches 104.

As described above, in some embodiments, the pouch opening device 112 may include a pair of v-blocks. Each of the v-blocks may index towards each other from a first position to a second position, pushing the self-closing frame 114 to open the pouch 104. Once the loading and/or unloading operation is done, the v-blocks of the pouch opening device 112 may disengage from the self-closing frame 114 and/or may index from the second position back to the first position. Once the pushing force on the self-closing frame 114 from the pouch opening device 112 is removed, the self-closing frame 114 closes the pouch 104 automatically.

Example Apparatus for Implementing Embodiments of the Present Invention

FIGS. 2a-2b illustrate perspective views of the pouch 104, in accordance with one or more embodiments of the present disclosure.

FIG. 2a illustrates a perspective view of the pouch 104 in closed position. FIG. 2b illustrates a perspective view of the pouch 104 in open position (or loading/unloading position). As shown in FIGS. 2a-2b, the pouch 104 includes an upper self-closing frame 114a and a lower self-closing frame 114b attached to opposite ends of the pouch body 116. The upper self-closing frame 114a may be coupled to the pouch hanger 106, as shown.

In accordance with the present disclosure, during conveyance, both the upper self-closing frame 114a and the lower self-closing frames 114b may be in closed position, as shown in FIG. 2a. At a loading and/or an unloading station, the pouch opening devices 112 may index and engage with the upper self-closing frame 114a and/or the lower self-closing frame 114b to open the pouch 104 for loading and/or unloading.

For example, with reference to FIG. 2b, the pouch opening device 112 includes two v-blocks positioned opposite to each other. The v-blocks index and push the lower self-closing frame 114b, such that the self-closing frame 114b flexes to an open position. Once the pouch 104 has a bottom opening, articles stored in the pouch 104 may be unloaded from the pouch 104. Further, on completion of the unloading operation, the pouch opening device 112 having two v-blocks may index to the position as shown in FIG. 2a. Once the v-blocks stop pushing the lower self-closing frame 114b, the lower self-closing frame 114b closes automatically.

It should be noted that pouch opening device 112 is not limited to v-blocks, and may include other suitable device and/or system for flexing the upper self-closing frame 114a and/or the lower self-closing frame 114b, such that a top and/or a bottom opening is created to the pouch 104.

Further, in another embodiment, the pouch 104 may only have one self-closing frame. For example, the top of the pouch 104 may be always open for loading, and the pouch 104 may only have the lower self-closing frame 114b for selectively opening for unloading.

FIGS. 3a-3b illustrate perspective views of the self-closing frame 114, in accordance with one or more embodiments of the present disclosure.

FIG. 3a illustrates a perspective view of the self-closing frame 114 in a flexed, open position. FIG. 3b illustrates a perspective view of the self-closing frame 114 in a closed position.

In accordance with the present disclosure, the self-closing frame 114 may include a first frame section 302 and a second frame section 304. In an embodiment, the first frame section 302 and/or the second frame section 304 may include a plurality of clamp plates 322 arranged vertically, as shown in FIGS. 3a-3b. The plurality of clamp plates 322 may be coupled to each other through a linkage 323. The linkage 323 may refer to applicable means of coupling the clamp plates 322 while providing structural support and/or maintaining vertical alignment of the clamp plates 322. The linkage 323 may refer to a clip, a band, and/or any other coupling means for holding the clamp plates 322 together.

The first frame section 302 may further include a first portion 306 and a second portion 308. The first portion 306 and the second portion 308 of the first frame section 302 may be coupled to each other through a first joint 310 (for example, a hinge), as shown in FIG. 3a. The second frame section 304 may further include a first portion 312 and a second portion 314. The first portion 312 and the second portion 314 of the second frame section 304 may be coupled to each other through a second joint 316 (for example, a hinge), as shown in FIG. 3a.

In some embodiments, the first joint 310 and/or the second joint 316 may include a leaf spring device 324, as shown in FIGS. 3a-3b. The leaf spring device 324 may hold the clamp plates 322 at a flat position (for example, 180 degrees) when the self-closing frame 114 is in a closed position. In an embodiment, the linkage 323 (as described above) may include the first joint 310 and/or the second joint 316.

Further, the first frame section 302 and the second frame section 304 may be coupled to each other by a first coupler 318 at a first end and a second coupler 320 at a second end, as shown in FIGS. 3a-3b. In an embodiment, the first coupler 318 and/or the second coupler 320 may include a torsion spring device 326, as shown in FIGS. 3a-3b. The torsion spring device 326 may include a spring 328 woven around a cam roller 330, as shown.

In an embodiment, the first coupler 318 and/or the second coupler 320 may be pushed inward by the pouch opening device 112 to, for example, flex the self-closing frame 114 to an open position. As a result, the spring 328 woven around the cam roller 330 may uncoil, and tension may build up in the spring 328. When the pushing force is withdrawn, due to the tension in the spring 328, the spring 328 may snap back to its original position, moving the self-closing frame 114 back to a closed position. Thus, the torsion spring device 326 may enable the self-closing frame 114 to spring back to the closed position from the open position.

In accordance with the embodiments of the present disclosure, the first frame section 302 may be coupled to the second frame section 304 by the first coupler 318 and the second coupler 320, such that the first coupler 318 and the second coupler 320 may be movable inward towards each other, flexing the first frame section 302 about the first joint 310 and the second frame section 304 about the second joint 316, as shown in FIG. 3a.

As described above, in an embodiment, the first joint 310 and/or the second joint 316 may include the leaf spring device 324. The leaf spring device 324 may be coupled to the clamp plates 322 creating a hinged joint, such that when the self-closing frame 114 is flexed, the leaf spring device 324 may bend inwards, thus building a tension in the leaf spring device 324. When a pushing force flexing the self-closing frame 114 is withdrawn, the tension in the leaf spring device 324 causes the leaf spring device 324 to snap back to a 180 degrees flat position.

As described above, the first coupler 318 and/or the second coupler 320 may engage with a pouch opening device (such as the pouch opening device 112 as shown in FIGS. 1, 2a, and 2b). The pouch opening device 112 may index the first coupler 318 and/or the second coupler 320 inward, thus flexing the first frame section 302 about the first joint 310 and the second frame section 304 about the second joint 316. In other words, the first portion 306 and the second portion 308 of the first frame section 302 may pivot around the first joint 310, moving from a 180 degrees flat position to creating an acute angle between the first portion 306 and the second portion 308 at the first joint 310. Similarly, the first portion 312 and the second portion 314 of the second frame section 304 may pivot around the second joint 316, moving from a 180 degrees flat position to creating an acute angle between the first portion 312 and the second portion 314 at the second joint 316.

Further, when the pouch opening device 112 disengages and/or indexes away from the first coupler 318 and/or the second coupler 320, the torsion spring device 326 of the first coupler 318 and/or the second coupler 320 may move the first coupler 318 and/or the second coupler 320 outward to straighten the first frame section 302 and/or the second frame section 304. Further, the leaf spring device 324 of the first joint 310 and/or the second joint 316 may hold the first frame section 302 and/or the second frame section 304 in a flat position, as shown in FIG. 3b, thus closing the self-closing frame 114.

Figure 4:
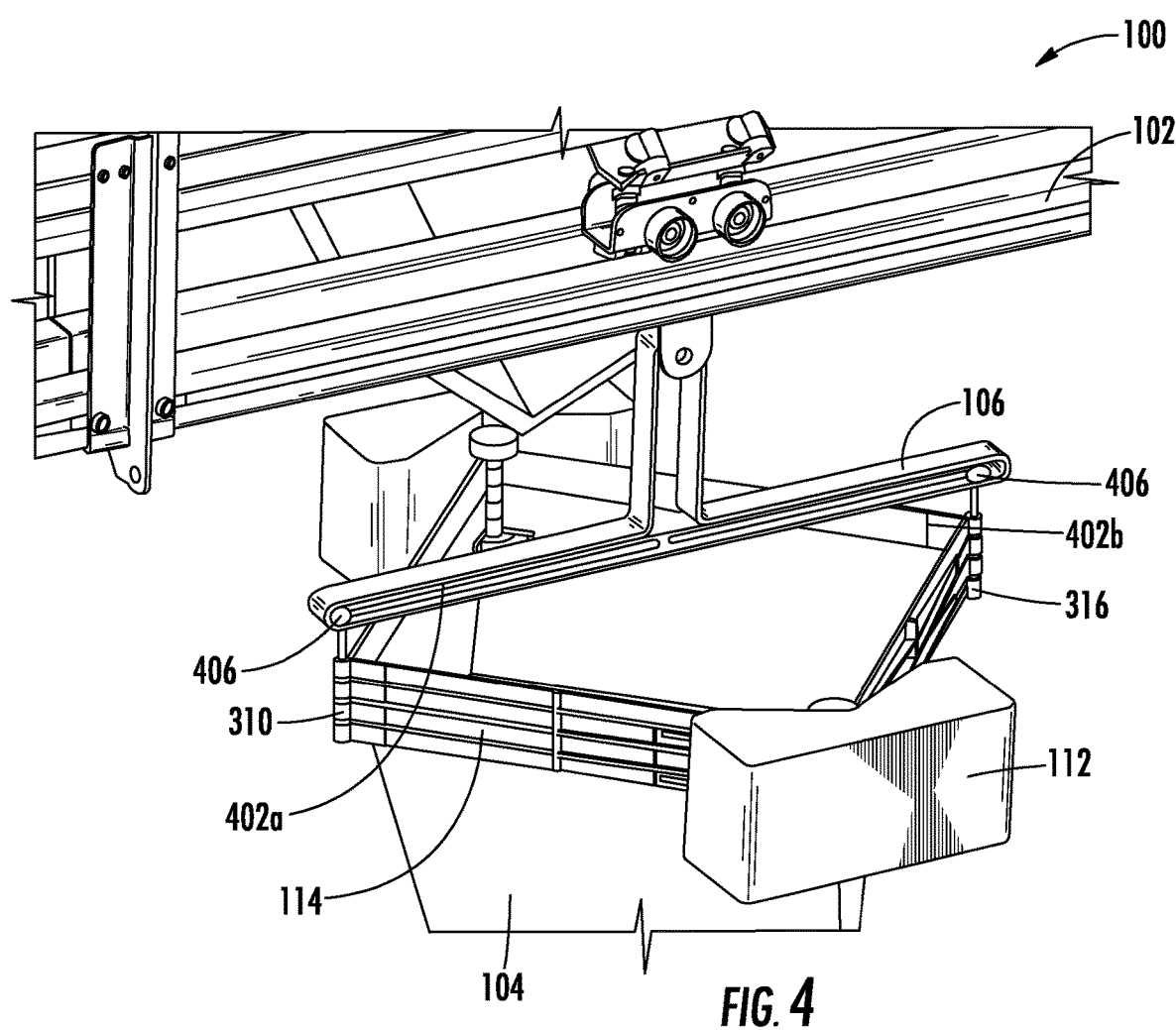
FIG. 4 illustrates another perspective view of the pouch conveying system in accordance with one or more embodiments of the present disclosure.

FIG. 4 illustrates a perspective view of the pouch conveying system 100, in accordance with one or more embodiments of the present disclosure.

As shown in FIG. 4, the pouch 104 may be suspended from the overhead conveyor 102 through the pouch hanger 106. The overhead conveyor 102 may move the pouch hanger 106 to route the pouch 104 in a direction of conveyance. Further, the pouch hanger 106 may include one or more channels built in a body of the pouch hanger 106. The one or more channels may refer to a groove, a depression, and the like, built in the body for the pouch hanger 106. In an embodiment, the pouch hanger 106 includes a first channel 402a and a second channel 402b, as shown in FIG. 4.

The pouch hanger 106 may further include a first stabilizing pin 404 movable in the first channel 402a and a second stabilizing pin 406 movable in the second channel 402b. Further, in accordance with the present disclosure, the first stabilizing pin 404 may be coupled to the first joint 310 of the self-closing frame 114, as shown in FIG. 4. For example, the first joint 310 may include a cylindrical opening for receiving the first stabilizing pin 404. Further, the first stabilizing pin 404 may include a head of a larger diameter, such that a body of the first stabilizing pin 404 may pass through the first channel 402a into the cylindrical opening of the first joint 310 while the head of the first stabilizing pin 404 may be large enough to not pass through the first channel 402a. Similarly, the second stabilizing pin 406 may be coupled to the second joint 316 of the self-closing frame 114.

In an embodiment, when the self-closing frame 114 is in a closed and/or flat position, the first stabilizing pin 404 and the second stabilizing pin 406 may be positioned at proximate ends of the first channel 402a and the second channel 402b, as shown in FIGS. 2a-2b. Further, when the self-closing frame 114 is flexed by the pouch opening device 112, the first stabilizing pin 404 and/or the second stabilizing pin 406 may move from the proximate ends of the first channel 402a and/or the second channel 402b to its respective distal end(s), as shown in FIG. 4. Thus, the self-closing frame 114 flexes in a controlled manner to a near square opening, as shown. Further, the first stabilizing pin 404 and the second stabilizing pin 406 keep the pouch 104 steady against rotation during engagement of the pouch opening device 112 with the lower self-closing frame during unloading.

Example Controller for Implementing Embodiments of the Present Invention

Figure 5:
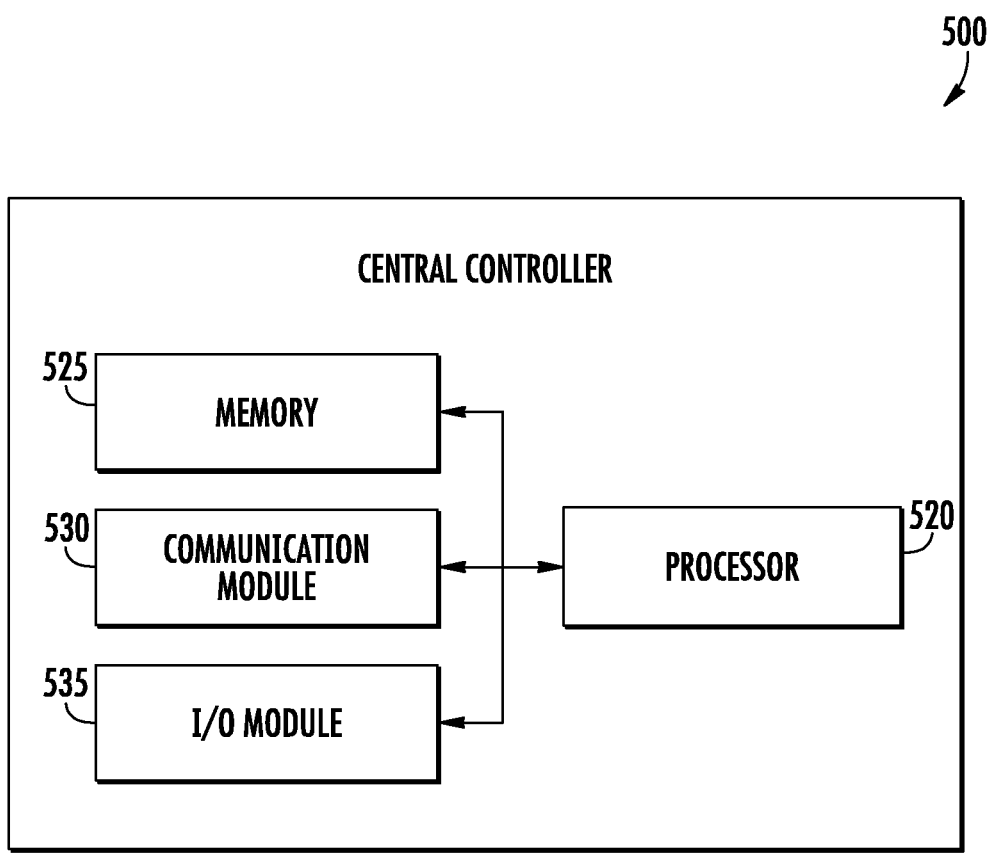
FIG. 5 illustrates a schematic block diagram of a central controller of the pouch conveying system, in accordance with one or more embodiments of the present disclosure.

FIG. 5 illustrates a schematic block diagram of a central controller 500 for controlling the operation of the pouch conveying system 100, in accordance with one or more embodiments of the present disclosure. The central controller 500 may include at least one processor 520, memory 525, communication module 530, and input/output module 535, as shown in FIG. 5.

The processor 520 may be configured with processor executable instructions to perform operations described herein. Processor 520 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments processor 520 comprises a plurality of processors. The plurality of processors may be embodied on a single device or may be distributed across a plurality of devices. The plurality of processors may be in operative communication with each other and may be collectively configured to perform one or more functionalities of the central controller 500 as described herein. In an example embodiment, processor 520 is configured to execute instructions stored in memory 525 or otherwise accessible to processor 520. These instructions, when executed by processor 520, may cause central controller 500 to perform one or more of the functionalities of central controller 500.

Memory 525 may comprise, for example, volatile memory, non-volatile memory, or some combination thereof. Although illustrated in FIG. 5 as a single memory, memory 525 may comprise a plurality of memory components. The plurality of memory components may be embodied on a single device or distributed across a plurality of devices. In various embodiments, memory 525 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 525 may be configured to store information, data (including item data and/or profile data), applications, instructions, or the like for enabling central controller 500 to carry out various functions in accordance with embodiments of the present invention. For example, in at least some embodiments, memory 525 may buffer input data for processing by processor 520. Additionally or alternatively, in at least some embodiments, memory 525 may store program instructions for execution by processor 520. Memory 525 may store information in the form of static and/or dynamic information. This stored information may be stored and/or used by the central controller 500 during the course of performing its functionalities.

Communications module 530 may be embodied as any device or means embodied in circuitry, hardware, a computer program product comprising computer readable program instructions stored on a computer readable medium (e.g., memory 525) and executed by a processing device (e.g., processor 520), or a combination thereof that is configured to receive and/or transmit data from/to another device and/or network, such as, for example, overhead conveyor 102, pouch opening device 112, and the like. In some embodiments, communications module 530 (like other components discussed herein) can be at least partially embodied as or otherwise controlled by processor 520. In this regard, communications module 530 may be in communication with processor 520, such as via a bus. Communications module 530 may include, for example, an antenna, a transmitter, a receiver, a transceiver, network interface card and/or supporting hardware and/or firmware/software for enabling communications with another device. Communications module 530 may be configured to receive and/or transmit any data that may be stored by memory 525 using any protocol that may be used for communications between devices. Communications module 530 may additionally or alternatively be in communication with the memory 525, input/output module 535 and/or any other component of the central controller 500, such as via a bus.

Input/output module 535 may be in communication with processor 520 to receive an indication of a user input and/or to provide an audible, visual, mechanical, or other output to a user. As such, input/output module 535 may include support, for example, for a keyboard, a mouse, a joystick, a display, a touch screen display, a microphone, a speaker, a RFID reader, barcode reader, biometric scanner, and/or other input/output mechanisms. In embodiments wherein the central controller 500 is embodied as a server or database, aspects of input/output module 535 may be reduced as compared to embodiments where the central controller 500 is implemented as an end-user machine (e.g., remote worker device and/or employee device) or other type of device designed for complex user interactions. In some embodiments (like other components discussed herein), input/output module 535 may even be eliminated from the central controller 500. Alternatively, such as in embodiments wherein the central controller 500 is embodied as a server or database, at least some aspects of input/output module 535 may be embodied on an apparatus used by a user that is in communication with the central controller 500. Input/output module 535 may be in communication with the memory 525, communications module 530, and/or any other component(s), such as via a bus. One or more than one input/output module and/or other component can be included in the central controller 500.

Example Method for Implementing Embodiments of the Present Invention

Figure 6:
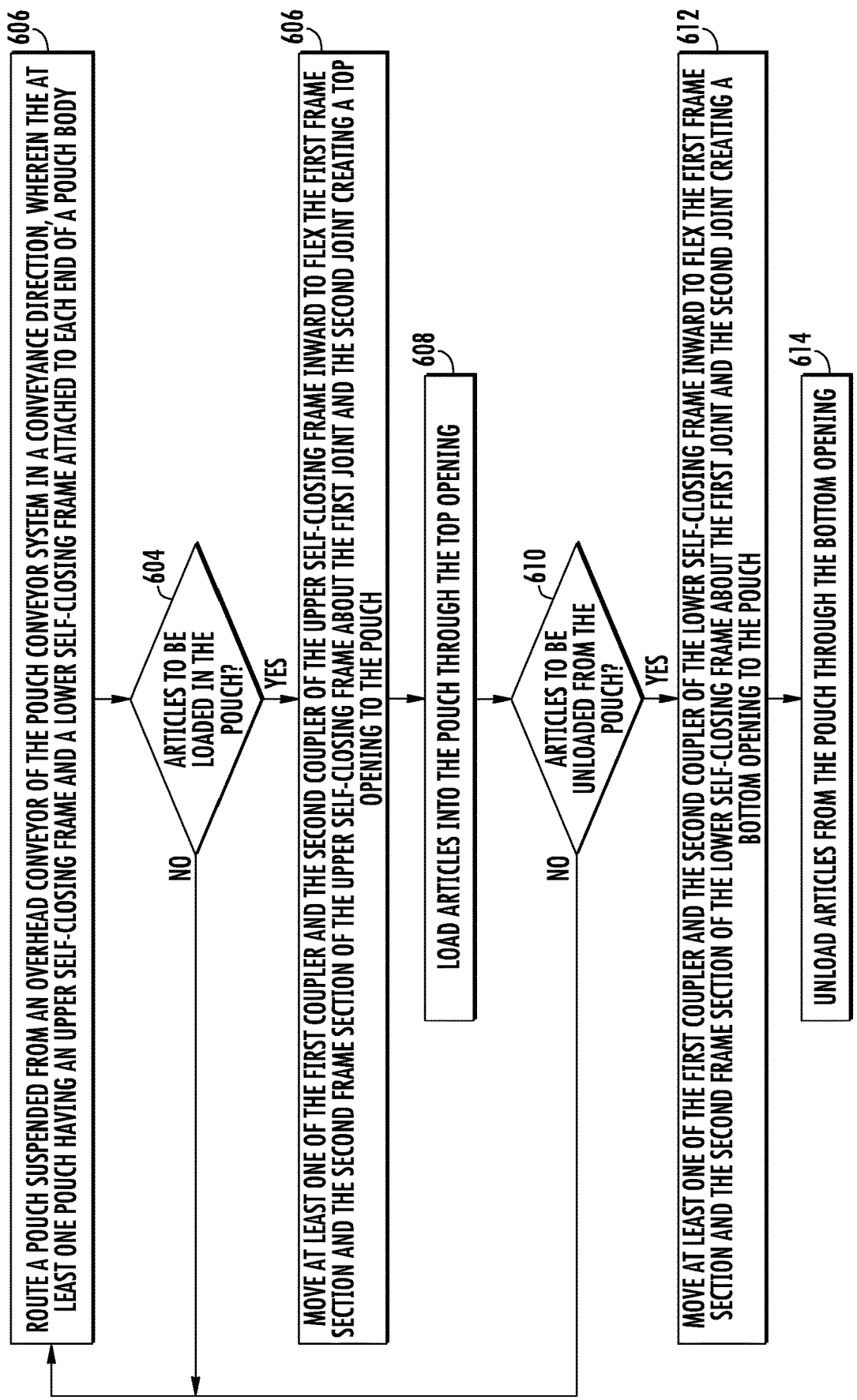
FIG. 6 illustrates an example method for operating a pouch conveying system, in accordance with one or more embodiments of the present disclosure.

FIG. 6 illustrates an example method 600 for operating the pouch conveying system 100, in accordance with one or more embodiments of the present disclosure.

The method 600 may include routing the pouch 104 suspended from the overhead conveyor 102 of the pouch conveying system 100 in a conveyance direction, at block 602.

In an embodiment, the overhead conveyor 102 may be in communication with the central controller 500 to receive routing instructions from the central controller 500. The overhead conveyor 102 may route the pouch 104 based on the routing instructions. In another embodiment, the overhead conveyor 102 and/or a device associated with the overhead conveyor 102 may control routing of the pouch 104. Further, routing of the pouch 104 may be dependent on upstream and/or downstream conditions (for example, in a distribution center).

As described above with reference to FIGS. 2a-2b, the pouch 104 includes the upper self-closing frame 114a and the lower self-closing frame 114b attached to each end of the pouch body 116. Further, each of the upper self-closing frame 114a and the lower self-closing frame 114b may include the first frame section 302 having the first portion 306 and the second portion 308 coupled to each other through the first joint 310, as described above with reference to FIGS. 3a-3b. Each of the upper self-closing frame 114a and the lower self-closing frame 114b may include the second frame section 304 having the first portion 312 and the second portion 314 coupled to each other through the second joint 316, as described above with reference to FIGS. 3a-3b. The second frame section 304 may be coupled to the first frame section 302 at a first end by the first coupler 318 and at a second end by the second coupler 320.

The method 600 may further include determining a loading condition for the pouch 104, at block 604. The loading condition may indicate that one or more articles are to be loaded into the pouch 104.

In an embodiment, the central controller 500 may monitor loading conditions (for example, at the loading station 108, as shown in FIG. 1). In an embodiment, the central controller 500 may determine loading condition based on data provided by one or more sensors, such as, but not limited to, photo-eyes, chute sensors, cameras, and the like. In another embodiment, the loading condition may be determined by a visual inspection by a human operator.

If, at block 604, the method 600 determines that there is no article to be loaded in the pouch 104, the method 600 proceeds to block 602, and pouch 104 is routed further in the conveyance direction.

If, at block 604, the method 600 determines that there is at least one article to be loaded in the pouch 104, the method 600 proceeds to block 606. Specifically, the central controller 500 may provide an indication of the loading condition (determined at block 604) to the overhead conveyor 102. In response, the overhead conveyor 102 may route the pouch 104 to the loading station 108. In another embodiment, the loading condition may be checked once the pouch 104 is already at the loading station 108.

Further, the central controller 500 and/or the pouch opening device 112 may initiate indexing pouch opening device 112 towards the pouch 104 for opening the pouch 104 for loading. In an embodiment, the pouch opening device 112 may be coupled to a robotic arm, a slider, and/or any other translational motion means communicatively coupled to the central controller 500 for controlling the pouch opening device 112, in accordance with one or more embodiments of the present disclosure. At block 606, the method 600 may include moving the first coupler 318 and/or the second coupler 320 of the upper self-closing frame 114a inward to flex the first frame section 302 and/or the second frame section 304 of the upper self-closing frame 114a about the first joint 310 and the second joint 316, creating a top opening to the pouch 104, as shown in FIG. 4. As described above, the pouch opening device 112 may index inward towards the first coupler 318 and/or the second coupler 320 of the upper self-closing frame 114a, thus flexing the upper self-closing frame 114a into an opening position.

Further, the method 600 includes loading articles into the pouch 104 through the top opening, at block 608. Loading may include automated transfer of articles from a chute, conveyor, bin, and the like, or a manual transfer of articles into the pouch 104.

In an embodiment, while loading, the lower self-closing frame 114b of the pouch 104 remains closed to retain the contents of the pouch 104. Further, in an embodiment, the loading may be controlled by the central controller 500, such that when desired articles have been loaded (for example, tracked by weight of the pouch 104), the pouch opening device 112 may be indexed back away from the pouch 104 so that the top opening of the pouch 104 is automatically closed, preventing further loading.

The method 600 may further include determining an unloading condition for the pouch 104, at block 610.

The unloading condition may indicate that one or more articles are to be unloaded from the pouch 104. In an embodiment, the central controller 500 may monitor unloading conditions (for example, at the unloading station 110, as shown in FIG. 1). In an embodiment, the central controller 500 may determine unloading condition based on data provided by one or more sensors, such as, but not limited to, photo-eyes, cameras, and the like. In another embodiment, the unloading condition may be determined by a characteristic of the pouch 104, such as, a change in weight, shape, speed, and the like. Additionally or alternatively, the central controller 500 may track articles loaded in the pouch 104 to determine pouch fullness for unloading. In yet another embodiment, the unloading condition may be determined by a visual inspection by a human operator.

If, at block 610, the method 600 determines that there are no articles to be unloaded from the pouch 104, the method 600 proceeds to block 602, and pouch 104 is routed further in the conveyance direction.

If, at block 610, the method 600 determines that articles are to be unloaded from the pouch 104, the method 600 proceeds to block 612. Specifically, the central controller 500 may provide an indication of the unloading condition (determined at block 610) to the overhead conveyor 102. In response, the overhead conveyor 102 may route the pouch 104 to the unloading station 110. In another embodiment, the unloading condition may be checked once the pouch 104 is already at the unloading station 110.

Further, the central controller 500 and/or the pouch opening device 112 may initiate indexing pouch opening device 112 towards the pouch 104 for opening the pouch 104 for unloading. At block 612, the method 600 may include moving the first coupler 318 and/or the second coupler 320 of the lower self-closing frame 114b inward to flex the first frame section 302 and/or the second frame section 304 of the lower self-closing frame 114b about the first joint 310 and the second joint 316, creating a bottom opening to the pouch 104, as shown in FIG. 2b. As described above, the pouch opening device 112 may index inward towards the first coupler 318 and/or the second coupler 320 of the lower self-closing frame 114b, thus flexing the lower self-closing frame 114b into an opening position.

Further, the method 600 includes unloading articles from the pouch 104 through a bottom opening, at block 614. Unloading may include articles falling from the pouch 104 into a bin, conveyor, tote, and the like.

In an embodiment, the unloading may be controlled by the central controller 500, such that, when desired articles have unloaded, for example, tracked by weight of the pouch 104, the pouch opening device 112 may be indexed back away from the pouch 104, to automatically close the bottom opening of the pouch 104, preventing further unloading.

Thus, the pouch conveying system 100 of the present disclosure routes, loads, and/or unloads pouches 104 automatically by controlling the pouch opening devices 112 for flexing the self-closing frames 114 of the pouches 104, as described above.

Additional Implementation Details

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 520, as discussed above with reference to FIG. 5, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 525) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed; however, it is to be understood that the disclosed embodiments are merely exemplary of the invention, which may be embodied in various forms.

While it is apparent that the illustrative embodiments of the invention herein disclosed fulfill the objectives stated above, it will be appreciated that numerous modifications and other embodiments may be devised. Accordingly, it will be understood that the appended claims are intended to cover all such modifications and embodiments, which come within the spirit and scope of the present invention.

What is claimed is:

1. A pouch conveying system comprising:
   an overhead conveyor comprising at least one pouch hanger, the overhead conveyor configured to route the at least one pouch hanger; and
   at least one pouch suspended from the overhead conveyor from the at least one pouch hanger, wherein the at least one pouch comprises at least one self-closing frame attached to an end of the pouch, and wherein the at least one self-closing frame is controlled by at least one pouch opening device, the at least one self-closing frame comprising:
      a first frame section having at least two portions coupled to each other through a first joint; and
      a second frame section having at least two portions coupled to each other through a second joint, wherein a first end of the second frame section is coupled to the first frame section by a first coupler and a second end of the second frame section is coupled to the first frame section by a second coupler such that at least one of the first coupler and the second coupler is pushed by the at least one pouch opening device to move inward, flexing the first frame section and the second frame section about the first joint and the second joint to open the at least one pouch.

2. The pouch conveying system of claim 1, wherein the at least one of the first coupler and the second coupler configured to move outward to straighten the at least one of the first frame section and the second frame section on removal of a force applied by the at least pouch opening device to close the at least one pouch.

3. The pouch conveying system of claim 1, wherein each of the first frame section and the second frame section comprises a plurality of clamp plates.

4. The pouch conveying system of claim 1, wherein at least one of the first joint and the second joint comprises a leaf spring device.

5. The pouch conveying system of claim 1, wherein the at least one of the first coupler and the second coupler comprises a torsion spring device.

6. The pouch conveying system of claim 1, wherein the at least one pouch comprises an upper self-closing frame attached to an upper end of the pouch and a lower self-closing frame attached to a lower end of the pouch.

7. The pouch conveying system of claim 6, wherein, in response to detecting a loading condition, at least one of a first coupler and a second coupler of the upper self-closing frame move inward to flex a first frame section and a second frame section of the upper self-closing frame about a first joint and a second joint, creating a top opening for loading one or more articles into the at least one pouch through the top opening.

8. The pouch conveying system of claim 6, wherein, in response to detecting an unloading condition, at least one of a first coupler and a second coupler of the lower self-closing frame move inward to flex a first frame section and a second frame section of the lower self-closing frame about a first joint and a second joint, creating a bottom opening for unloading one or more articles from the at least one pouch through the bottom opening.

9. The pouch conveying system of claim 1, wherein the at least one pouch hanger comprises at least one channel and at least one stabilizing pin movable in the at least one channel, wherein the at least one stabilizing pin is coupled to at least one of the first joint and the second joint of the at least one self-closing frame, such that the at least one stabilizing pin moves towards an end of the at least one channel for flexing the at least one of the first frame section and the second frame section.

10. The pouch conveying system of claim 9, wherein the at least one pouch hanger comprises at least two stabilizing pins movable in two channels, each coupled to the first joint and the second joint of the at least one self-closing frame respectively, such that the at least two stabilizing pins are positioned at proximate ends of the two channels when the at least one self-closing frame is closed.

11. The pouch conveying system of claim 10, wherein the at least two stabilizing pins move away from each other, towards distal ends of the two channels, when the at least one self-closing frame is flexed.

12. The pouch conveying system of claim 1, wherein the at least one pouch hanger disposed at an angle relative to the overhead conveyor.

13. The pouch conveying system of claim 1, wherein the at least one pouch opening device comprises of a pair of v-shaped blocks, wherein each of the v-shaped blocks index towards each other from a first position to a second position, pushing the self-closing frame to open the pouch.

14. A pouch for carrying one or more articles for conveyance on a pouch conveying system, the pouch comprising:
   a pouch for enclosing and holding the one or more articles; and
   at least one self-closing frame attached to an end of the pouch, the at least one self-closing frame comprising:
      a first frame section having at least two portions coupled to each other through a first joint; and
      a second frame section having at least two portions coupled to each other through a second joint, wherein a first end of the second frame section is coupled to the first frame section by a first coupler and a second end of the second frame section is coupled to the first frame section at a second end by a second coupler such that at least one of the first coupler and the second coupler is pushed to move inward, flexing the first frame section and the second frame section about the first joint and the second joint to open the pouch.

15. The pouch of claim 14, wherein each of the first frame section and the second frame section comprises a plurality of clamp plates.

16. The pouch of claim 14, wherein at least one of the first joint and the second joint comprises a leaf spring device.

17. The pouch of claim 14, wherein the at least one of the first coupler and the second coupler comprises a torsion spring device.

18. The pouch of claim 14, wherein the at least one of the first coupler and the second coupler pushed by a pouch opening device to move inward, flexing the first frame section and the second frame section about the first joint and the second joint to open the pouch.

19. The pouch of claim 18, wherein the at least one of the first coupler and the second coupler move outward to straighten the at least one of the first frame section and the second frame section on removal of a force applied by the pouch opening device to close the pouch.

20. The pouch of claim 18, wherein the pouch opening device comprises of a pair of v-shaped blocks, wherein each of the v-shaped blocks index towards each other from a first position to a second position, pushing the self-closing frame to open the pouch.

\* \* \* \* \*